United States Patent [19]

Bremer et al.

[11] Patent Number: 4,713,533

[45] Date of Patent: Dec. 15, 1987

[54] CONCENTRIC DETECTOR ARRAY AND ASSOCIATED HYBRID SIGNAL PROCESSING FOR COARSE AND FINE ELECTRO-OPTICAL TRACKING

[75] Inventors: James C. Bremer, Gaithersburg; Fred S. Hurt, Ellicott City; John G. Romanski, Annapolis; Richard F. Kroupa, Pasadena; Ronald G. Kraus, Severna Park, all of Md.

[73] Assignee: Westinghouse Electric Corp., Pittsburgh, Pa.

[21] Appl. No.: 816,097

[22] Filed: Jan. 3, 1986

[51] Int. Cl.[4] .................................................. G01J 1/20
[52] U.S. Cl. .................................. 250/203 R; 356/152
[58] Field of Search ........ 250/203 R, 201 R, 201 AF, 250/201 PF; 356/141, 152, 1, 4

[56] References Cited

U.S. PATENT DOCUMENTS

| | | | |
|---|---|---|---|
| 4,107,530 | 8/1978 | Brumfield et al. | 250/203 R |
| 4,154,530 | 5/1979 | Connolly, Jr. et al. | 356/152 |
| 4,224,507 | 9/1980 | Gendreu | 356/152 |
| 4,306,691 | 12/1981 | Boxenhorn et al. | 250/203 R |
| 4,401,886 | 8/1983 | Pond et al. | 250/203 R |

Primary Examiner—David C. Nelms
Assistant Examiner—William L. Oen
Attorney, Agent, or Firm—W. G. Sutcliff

[57] ABSTRACT

An improved target sighting device operable to converge on targets whose initial velocity has caused its image to move a significant fraction within the field of view during the period between detections utilizing less electrical circuitry and only one focal plane detector array. A detector array and associated signal processing system for incorporation within an electro-optical tracking system, the detector array comprising both fine track and coarse track detector elements wherein fine track and coarse track detector elements are further interconnected to hybrid fine track and coarse track signal processing algorithms. The resultant signals from the fine track and coarse track detections on the hybrid array will result in commands to gimbals about reflecting means or about a receiver telescope allowing the reflective means or receiver telescope means to be repositioned towards the target with greater accuracy.

18 Claims, 23 Drawing Figures

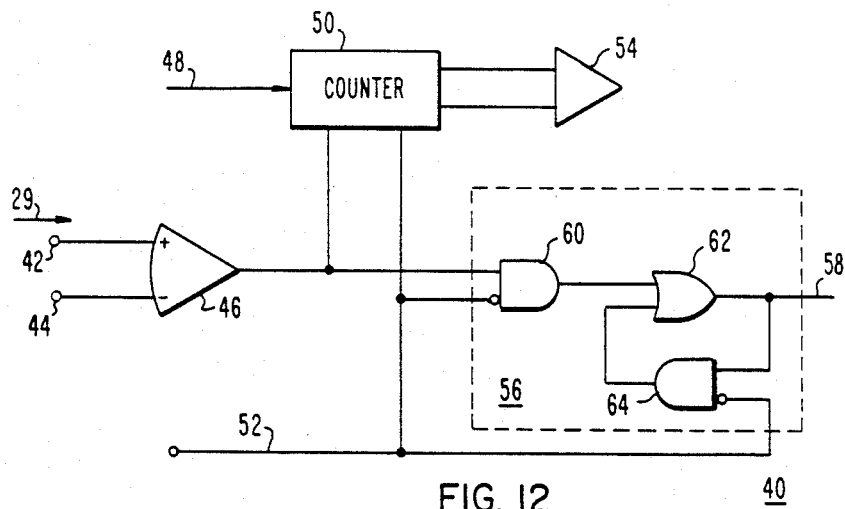
FIG. 12
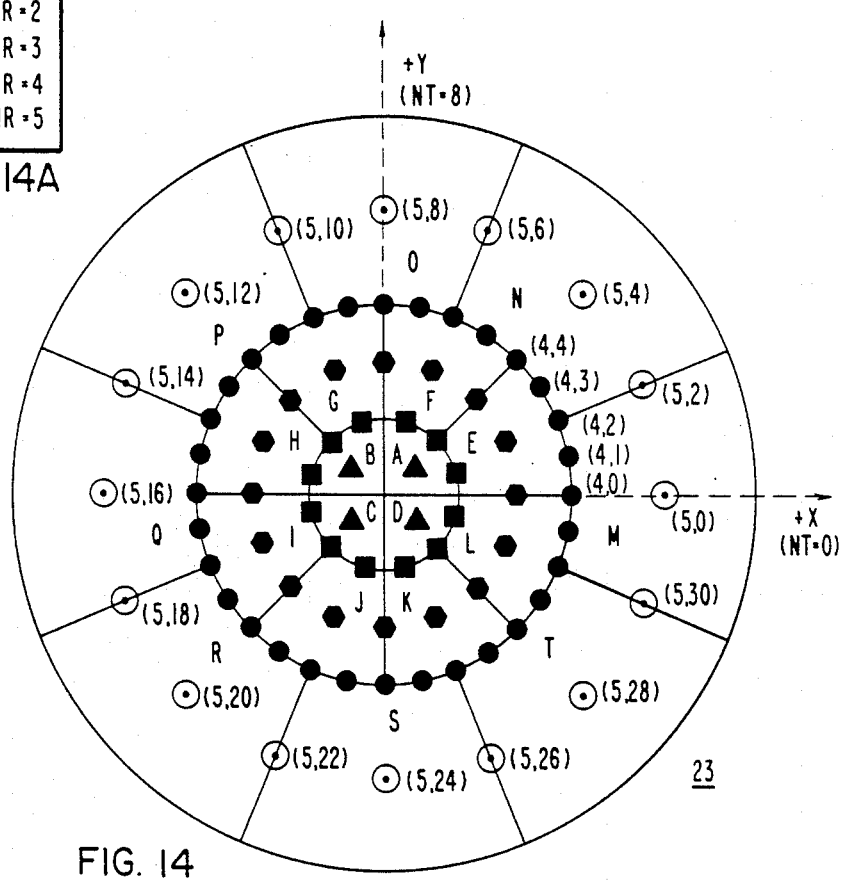
FIG. 14A
FIG. 14

CONCENTRIC DETECTOR ARRAY AND ASSOCIATED HYBRID SIGNAL PROCESSING FOR COARSE AND FINE ELECTRO-OPTICAL TRACKING

GOVERNMENT CONTRACT

This device was developed under U.S. Government Contract No. DAAH01-82-C-A178, A-55980-ACAA.

BACKGROUND OF THE INVENTION

1. Field of the Invention

The present invention is a detector array and associated signal processing system for incorporation into an electro-optical tracking loop.

2. Description of the Prior Art

The generalized tracking problem requires a system to acquire a target anywhere within a relatively wide field of view (FOV); to measure the offset between the target's position and the tracking position's boresight; to predict the position of the target at the time of the next pulse, and to drive the pointing system to this location. As this process is repeated, the offset becomes progressively smaller and the precision of the measurement consequently must become more accurate. This system to be successful, must converge on the target rapidly. The magnitude of the offset between the target angle and the boresight must decrease rapidly and must remain below a prespecified pointing error tolerance for an interval of time.

The tracking process initially requires relatively coarse offset measurements over a relatively wide field of view. As the tracking process proceeds, more precise measurements are required over smaller fields of view. Also, there are occasions when the system will be forced to "backtrack" to a wider field of view (during violent target acceleration or during target obstruction by physical interference).

Thus, a system which has the capacity to make coarse measurements over a wide field of view and more precise measurements over a narrow field of view simultaneously is preferable to a system which "zooms in" on the target as the tracking loop is closed.

There have been two main classes of detector arrays used in tracking loops, those which continuously monitor the output of each pixel with a high bandwidth amplifier and those which integrate the returns over an exposure period and output them sequentially. When a pulsed illuminator is used in the active systems, high bandwidth signal processing provides the following advantages: bandwidth of the receiver signals may be matched to that of the anticipated return to maximize the rejection of noise and the low bandwidth clutter; range may be effectively measured; a range dependent threshold may be set up for detection; and the time lag of the sequential readout is eliminated.

As shown in FIG. 1 of this application, a prior art passive electro-optical tracking loop is composed of the following subsystems: a receiver telescope, a detector array situated in the focal plane of the receiver telescope which measures the angular displacement of one or more targets in its field of view with respect to its boresight and a signal processing system which translates the outputs of the detector array into pointing angle commands.

The specific example has in FIG. 1, two receiver telescope means used to identify the targets. One receiver telescope means will identify the target and direct the optical energy reflected from the target or emitted from it (as would be in infrared radiation) to the fine track-detector array. The fine track detector array in turn would convert the optical energy received from the target into electrical energy.

This electrical energy would then input into the signal processing system fine track. Parallel to the fine track signal processing system would be a separate coarse track detector element which would be utilized to perform a coarse track reception of optical energy reflected or emitted from the target. Both the fine track and the coarse track are two separate parallel paths of receptors for optical energy from the target and both receptor paths have their own independent receiver telescope means. The integration of the fine track and the coarse track signal processing information is performed in the fine track/coarse track signal processing algorithms. As can be seen in cross section $I_A$—$I_A$ and cross section $I_B$—$I_B$, the fine track and coarse track focal plane arrays would be comprised of varying numbers of quadrants. The fine track quadrants would have a minimum of four quadrants while the coarse track elements would number more that four.

FIG. 2 of this application demonstrates the use of a beam splitter and only one receiver telescope means to achieve the same effect as the parallel path receiver telescope means of FIG. 1. This is a passive system where the target will emit or reflect energy to the receiver telescope means. The receiver telescope means comprises a convex and concave lens on a common colinear axis. The optical energy passing through the sole receiver telescope means strikes a beam splitter. A beam splitter is a selectively transmissive reflective means which permits a predetermined portion of the optical energy to pass through it to the fine track focal plane array and another predetermined portion of the optical energy to pass through a second convex lens to the coarse track detector array.

Again, the fine track and coarse track detector arrays will convert the optical energy to electrical impulses which will be transmitted to the fine track and coarse track signal processing algorithms. Cross section $II_A$—$II_A$ demonstrates the fine track detector array and cross section $II_B$—$II_B$ demonstrates the coarse track detector array. This system is again a passive system meaning that there is no energy generated within this system and sent to strike the target where it is reflected back into the receiver telescope means.

A generic active electro-optical tracking loop would be composed of: a pulsed laser illuminator, a receiver telescope, a detector array situated in the focal plane of the receiver telescope which again would measure the angle of displacement of one or more targets in its field of view with respect to its boresight and a signal processing system which would translate the outputs of this detector array and to pointing signal commands. The active electro-optical tracking loop would utilize the pulse laser illuminator to direct a beam of optical energy to the moving target. This energy would either enter the receiver telescope means directly as in a direct reflection or the optical energy from the pulse laser illuminator would be reflected to a reflective means which in turn would reflect that optical energy into the receiver telescope.

The example of prior art as shown in FIGS. 1 and 2 are exemplary of the many examples that can found used currently for electro-optic tracking loop systems.

The electro-optic tracking loop therefore as seen in the prior art utilizes either one or two receiver telescopes and must use two distinct detector element arrays, one for fine track and one for coarse tracking, with distinct and separate coarse track and fine track signal processing.

The patent to Fellman, U.S. Pat. No. 3,993,888, dated Nov. 23, 1976 is noted for its disclosure of an image processing device using a photodiode detector array consisting of a circular central element surrounded by 24 radial elements. A digital logic signal is produced which is the binary representation of the portion of the image centered on the array.

The patent to Beck et al., U.S. Pat. No. 4,398,408, dated July 12, 1983 is further noted for its disclosure of an opto-electronic device in which the array of the detectors comprises a plurality of detectors extending from the optic axis of the device and signals delivered by the array are processed through a transcribing synchronizing circuit for causing a pair of cartesian coordinants to correspond sequentially to each pair of coordinants.

Finally, the patent to Walker et al., U.S. Pat. No. 4,191,957, dated Mar. 4, 1980 is additionally noted for its disclosure of a method of processing range doppler data using a polar recording format.

The problem to be solved is the efficient detection of target images utilizing a common detector array in which all sub-boundaries are either concentric circles or radii emanating from the common origin of the circles with a combination of concentric fine track and coarse track arrays used on a single focal plane. And, a combined coarse track fine track signal processing algorithm to simplify and eliminate additional components in the optical tracking system.

SUMMARY OF THE INVENTION

FIG. 3 shows an electro-optic target tracking system for measuring the angular displacement of a target relative to the tracking system boresight.

This passive electro-optic target tracking system would employ a wide field of view (FOV) optical detection means comprising: an optical detector array disposed upon the boresight of the system having first a four quadrant detector array portion in the central part of the array and at least one concentric ring of coarse track detector elements positioned about the central four quadrant array on the detector.

In this basic configuration, the coarse track and fine track arrays would be operable to receive the emitted optical energy which had been transmitted or emitted from the target. The emitted optical energy would pass through a receiver telescope means which comprise a convex and concave lens on a common colinear axis. The optical energy passing through the convex and concave lens respectively would then strike the focal plane array in the form of a blur circle. This blur circle is converted via the coarse track and fine track detector arrays to electrical energy. And, this electrical energy would in turn be processed via the coarse track and fine track signal processing algorithms located in connection with the focal plane array. The fine track and coarse track signal processing means in turn convert this electrical signal through the algorithms into pointing commands. The pointing commands would be interfaced with the two axis gimbal system which would be able to move the receiver telescope means in such a manner as to keep it on track with the target.

A signal processor means for the coarse track signal would resolve its algorithms using a threshold signal processing means. The coarse track signal processor coupled to the coarse track detector elements would "interpret" the electrical signals providing a simple method of acquiring a target's relative coarse offset estimates over a large field of view.

The geometry of the array would provide for a good angular quantization which is important for the conversions of the coarse track algorithm. The conventional quadrant cell with proportional tracking provides precise terminal tracking after the target has been localized around the vortex. This coarse track pointing command generator would use offset measurements to generate gimbal pointing commands and it would initially make position corrections to converge on the target.

If a time sequence of offset measurements indicated a velocity error, the velocity error correction could then be made. The detections in these coarse track outer cells would be processed as threshold data, i.e., a binary one would be registered if one of the thresholds is exceeded within the range gate and a zero would be registered otherwise.

Detections in the inner quadrant cell, the four small quadrant cell elements would have their data processed differently, quantitatively in nature.

In summary, a resolution to the problem proposed provides a fine track and coarse track estimating system for electrical optical tracking incorporating either a passive or active system which would issue a beam of light in the active state or be open to the receipt of emitted or transmitted energy from a target.

A secondary embodiment would utilize reflecting mirror interconnected to a two axis pointing system. This would enable the reflecting mirror to reposition itself relative to the bore center target of the reflected beam, either emitted from the target itself in the form of infrared energy. Or if an active system, energy would be the result of a pulsed laser illuminator. The pulsed laser illuminator sends out a beam of laser energy to strike the target. And, this energy would either be, in a passive system received directly by the receiver telescope; or in the active system striking a reflective mirror and the mirror in turn would reflect the this energy to the receiver telescope.

FIG. 4 is an example of a passive-reflective optical energy tracking system. The target emits optical energy to a reflective mirror. This mirror is positioned so as to reflect the emitted energy to a receiver telescope. Again, the receiver telescope comprises; a convex and concave lens in a common colinear configuration such that the optical energy reflected by the mirror would strike the focal plane array. The fine track and coarse track focal plane array are combined, and they transmit concurrently electrical impulses to the fine track and coarse track signal processing algorithms. Commands generated by these processing algorithms issue from the command generator initiating position changes in the two axis gimbal system which is connected to the reflective means.

FIG. 5 is an example of an active optical tracking system utilizing a pulsed laser illuminator directed towards the target. The laser energy from the laser illuminator strikes the target and is reflected directly into the receiver telescope. This receiver telescope comprising; a convex and concave lens in series aligned upon a common colinear axis directs the reflected energy beam to a focal plane array which comprises both fine track and coarse track detector elements. Again, the fine track and coarse track elements convert the optical energy to electrical signals and fine track and coarse track hybrid signal processing algorithms generate commands to the gimbal systems which would in this embodiment maneuver the receiver telescope means to maintain a position relative to the target.

FIG. 6 is an example of an active-reflective electro-optical tracking system. A pulsed laser beam strikes the reflective mirror and is reflected towards the target. The target reflects the laser beam from the illuminator back towards the reflective mirror. This energy is reflected into the receiver telescope which focuses the reflected energy to the hybrid focal plane array of fine and coarse track elements. This detector array of fine and coarse track elements converts the optical energy to electrical signals. These electrical signals are processed by the fine track and coarse track signal processing algorithms. And these algorithms generating pointing commands which will order the two axis gimbal system interconnected to the mirror to reposition the mirror in a position relative to the target.

This hybrid processing system minimizes the number of detector elements on the focal plane array, and complexity of the circuitry required to acquire a target anywhere within a relatively wide field of view. The ability to track targets precisely in the vicinity of the boresight is improved with less hardware and a simplicity in system design.

BRIEF DESCRIPTION OF THE DRAWINGS

For a better understanding of the invention, reference may be had of the preferred embodiment exemplary of the invention shown in the accompanying drawings, in which:

FIG. 12 is the schematic drawing of the coarse track detector array signal processing circuitry;

FIG. 14 is the plan view of the discrete addresses NR and NT as found on the combined coarse track symbol fine track detector array.

FIG. 14A is key for the Discrete addresses, NR in FIG. 14.

DESCRIPTION OF THE PREFERRED EMBODIMENT

Figure 1:
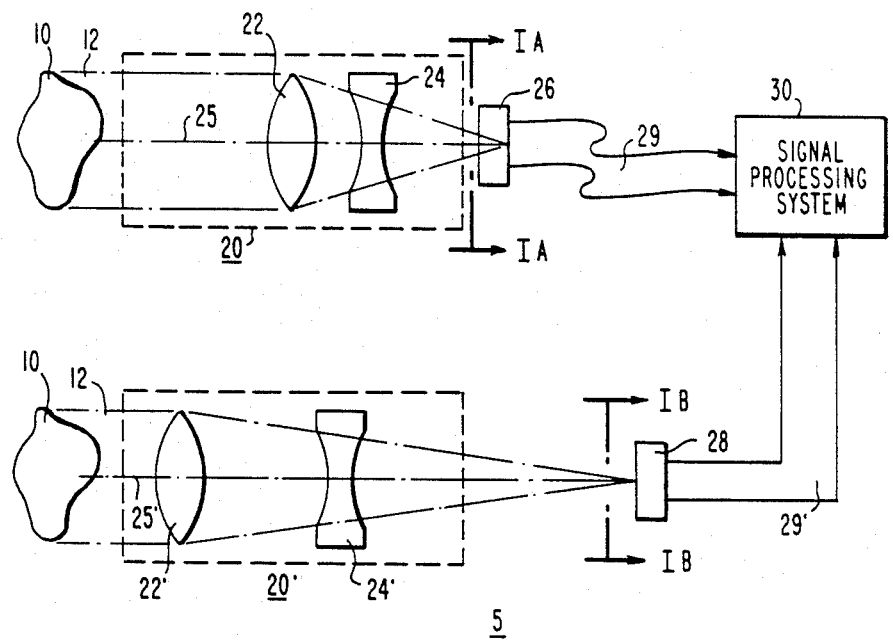
FIG. 1 is a plan view of the prior art electro-optical tracking system in the passive state utilizing two focal plane arrays for the measurement of displacement of a target relative to the tracking system boresight.

FIG. 1 shows an example in the prior art of an electro-optical tracking system 5. The target 10 emits or radiates an amount of optical energy 12 to a receiver telescope means 20 and 20'. The receiver telescope 20 is for the fine track detector array 26. The receiver telescope 20' is for the coarse track detector array 28. The receiver telescope means 20 comprises a convex lens 22 and a concave lens 24 in series along a common longitudinal axis 25. The receiver telescope means 20' comprises also a convex lens 22' and a concave lens 24' along a common longitudinal axis 25'.

Figure 1A:
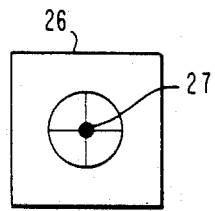
FIG. 1A is the cross-section of IA—IA in FIG. 1, and is the fine track detector array.

The optical energy 12 emitted from the target 10 will strike the fine track detector array 26 after passing through the receiver telescope means 20 and it will form a blur circle 27 as seen in FIG. 1A upon the fine track detector array 26. The optical energy 12 will pass also through the receiver telescope means 20' and it will strike the focal plane detector coarse track 28 forming a blur circle 27'. The optical energy blur circle 27 and 27' will then be converted to electrical energy in the form of an electrical signal from the fine track array 29 and an electrical impulse for signal 28 from the coarse track 29'. The fine track electrical signal 29 and the coarse track electrical signal 29' will both be combined within the signal processing system 30.

FIG. 1A is a cross-section of 26, the fine track detector array, it is cross-sectional by IA—IA and it shows the fine track detector array 26 and its accompanying blur circle 27.

Figure 1B:
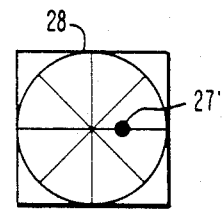
FIG. 1B is a cross-section of IB—IB in FIG. 1, and is the coarse track detector array.

FIG. 1B is a cross-section IB—IB of the coarse track detector array 28. By its very nature, the coarse track detector 28 will be physically larger in size than the fine track detector 26 and the number of elements making up the detector will be greater.

Figure 2:
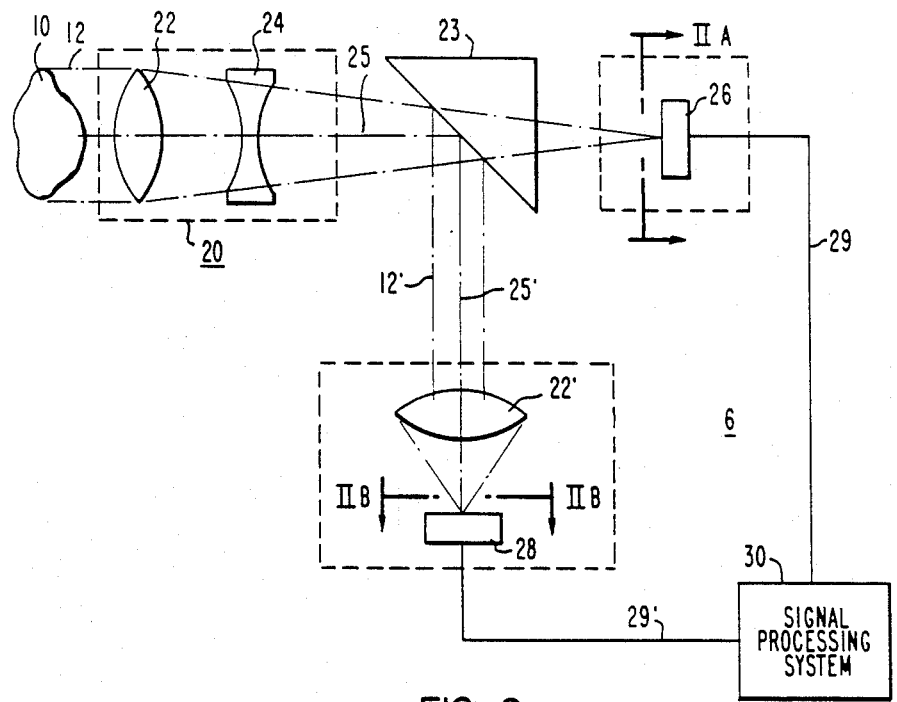
FIG. 2 is a plan view passive electro-optic tracking system utilizing a single receiver telescope means and beam splitter to measure the displacement of a target relative to a tracking system boresight.

FIG. 2 is another example of the prior art, a passive system optical detector 6. A receiver telescope means 20 receives emitted optical energy 12 from a target 10. This emitted optical energy 12 strikes the receiver telescope 20 and passes through convex lens 22 and concave lens 24, both of which are positioned upon a common colinear axis 25. The optical energy 12 after passing through the concave lens 24 strikes the beam splitter device 23 which has been positioned on a common colinear axis between the receiver telescope means 20 and the fine track detector array 26.

The beam splitter 23 is selectively transmittive, allowing a predetermined portion of optical energy 12 to pass through the beam splitter and remain on the common colinear axis with fine track detector array 26. Another predetermined portion of optical energy 12' will be reflected from the beam splitter to a convex lens 22'. This reflected optical energy 12' on a common colinear axis 25' with the convex lens 22' will then pass through the convex lens 22' striking the coarse track detector 28.

The optical energy will be converted to electrical energy by the fine track detector array 26 and coarse track detector array 28 and this electrical signal generated from the optical detectors 26, 28 will provide an electrical signal 29 from the four quadrant detector array 26 and electrical signal 29' from the multi-element coarse track detector 28. These two signals will be combined in the fine track coarse track signal processing algorithm 30.

This passive system optical detector means 6 utilizing a beam splitting device eliminates the use of a second receiver telescope means but still maintains two distinct optical energy signals to the fine track and coarse track detector arrays.

Figure 2A:
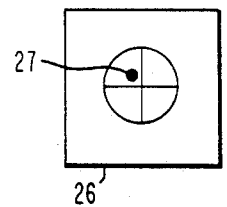
FIG. 2A is a cross-section of IIA—IIA in FIG. 2, and is the fine track detector array.

FIG. 2A is cross-section IIA—IIA of the fine track detector array showing the four quadrant detector array 26 with its respective blur circle 27. The blur circle is formed from the portion of optical energy which passed directly through the beam splitter 23.

Figure 2B:
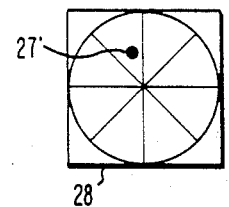
FIG. 2B is a cross-section of IIB—IIB in FIG. 2 and is a cross-section of the coarse track detector array.

FIG. 2B is a cross-section IIB—IIB of the coarse track detector array 28 with its blur circle 27'. This blur circle is a result of the optical energy which has been selectively reflected from the beam splitter device 23.

In summary, the prior art, as shown in FIGS. 1 and 2 demonstrate a passive optical tracking system utilizing emitted optical energy from a target with two separate, distinct focal plane arrays. A distinct fine track focal plane array 26 and a coarse track focal plane array 28 require significant detailed circuitry and extensive, distinct, fine track and coarse track signal processing algorithms 30. As shown in FIG. 2, utilizing a beam splitter in lieu of a second receiver telescope means 20, the passive system electro-optical tracking system will have a reduced amount of hardware but will still maintain two distinct arrays fine track 26 and coarse track array 28. Both arrays having distinct electrical impulses requiring fine track, coarse track signal processing algorithms 30.

Figure 3:
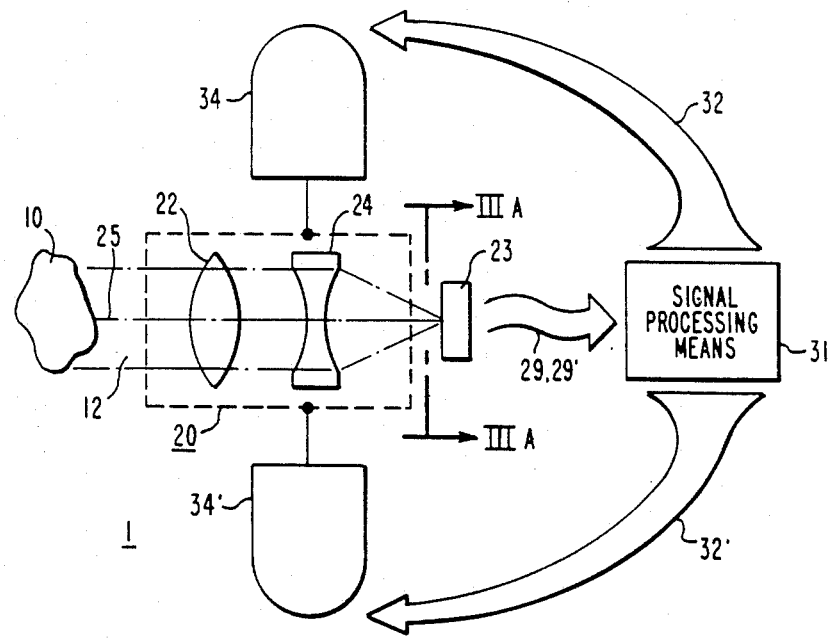
FIG. 3 is a plan view of the preferred embodiment, a passive electro-optical tracking system utilizing a single receiver telescope means and a coarse track fine track hybrid detector array.

FIG. 3 is a view of the preferred embodiment a passive electro-optical tracking system 1 with hybrid focal plane array. The target 10 emits optical energy 12 to a receiver telescope means 20. The receiver telescope means comprises a convex lens 22 and a concave lens 24. This receiver telescope means 20 with incorporated convex 22 and concave 24 lens lie upon a common colinear longitudinal axis 25. The emitted optical energy 12 passes through the receiver telescope means and is focussed in the form of a blur circle 27 upon the coarse track fine track focal plane detector 23. Electrical energy is generated by this focal plane array 23 and this electrical energy which we will call 29 and 29' dependent upon whether it is received upon the fine track array or the coarse track array will be channeled into a coarse track fine track signal processing means 31. This signal processing means 31 will contain algorithms necessary to convert the electrical signals 29 and 29' into commands 32 and 32' to a two-axis gimbal system 34 and 34'. The two-axis gimbal system 34 and 34' are interconnected with the receiver telescope means 20 and are operable to redirect the receiver telescope means 20 towards the target based upon the directions and commands 32 and 32' issued from the coarse track fine track signal processing means 31.

Figure 3A:
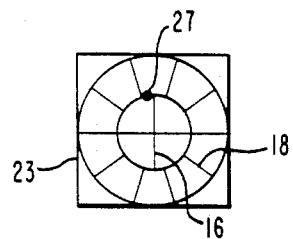
FIG. 3A is cross-section IIIA—IIIA which is the fine track coarse track detector array.

FIG. 3A is the hybrid fine track coarse track detector array 23 as it will appear in cross section IIIA—IIIA. This hybrid fine track/coarse track focal plane array 23 will comprise multiple elements for the coarse track detector 18 and distinct fine tracked detector quadrants 16 which are centered about the centroid of this detector array 23.

Figure 4:
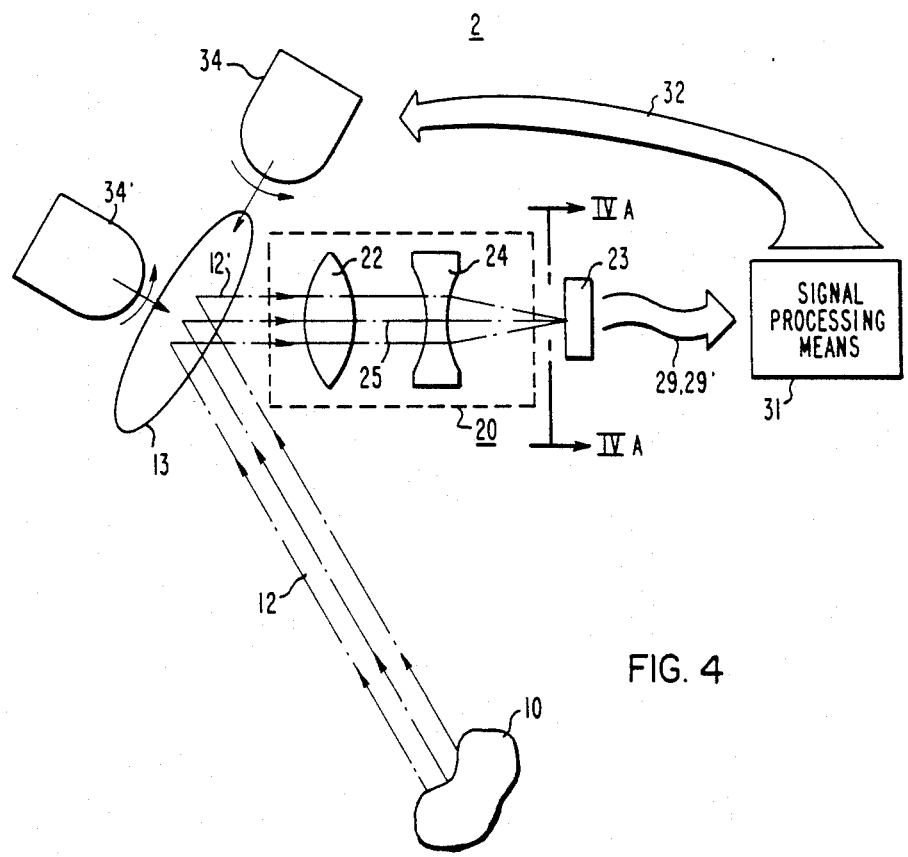
FIG. 4 is a plan view of the passive electro-optical tracking loop utilizing a reflective means.
Figure 4A:
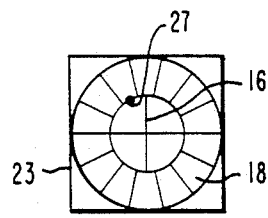
FIG. 4A is a cross-section of IVA—IVA, the focal plane detector array with combined fine track and coarse track elements.

FIG. 4 is another example of a passive electro-optical tracking loop. In this case, this electrical optical tracking loop 2 contains a reflective means 13 which will be utilized to harness or sweep the horizon for energy 12 as emitted from a target 10. This energy 12 emitted from target 10 will strike the reflective means 13 and be issued in the form of reflected optical energy 12'. The reflected optical energy 12' will pass through the receiver telescope means 20. Again the receiver telescope means 20 will contain a convex lens 22 and a concave lens 24. The reflected optical energy 12' passing through the receiver telescope means will strike the hybrid fine track/coarse track detector 23 in the form of a blur circle 27. This blur circle 27 as seen in FIG. 4A may rest or straddle upon the fine track quadrants and coarse track elements 16, 18 respectively. The fine track quadrants 16, form four quadrants centered about the centroid of the detector means 23. And the coarse track elements radiate about the circumference of the fine track quadrants 16 and are operable to achieve coarse track detection.

FIG. 4A is a cross-section of IVA—IVA focal plane detector hybrid 23. Optical energy 12' which has been centered upon the focal plane detector 23 as a blur circule 27 by the receiver telescope means 20 will result in the generation of electrical energy 29 and 29' from the optical energy 12'. The electrical energy 29 and 29' respectively refers to the electrical energy generated in the coarse track elements 18 or the fine track quadrants 16. The electrical energy 29 refers to the fine track energy generated in the quadrants 16 and the electrical energy 29' refers to the coarse track energy generated in elements 18 of the hybrid detector 23. These electrical signals will enter the fine track coarse track signal processing unit 31 wherein commands 32 will be generated from the signal processing algorithms 31. These commands will direct the two axis gimbal system 34, 34' as it is interconnected to the reflective means 13. The two axis gimbal system 34 and 34' will reposition the reflective means 13 in relation to the target and be operable to maintain a tracking distance and angle of incidence with the target 10.

Figure 5:
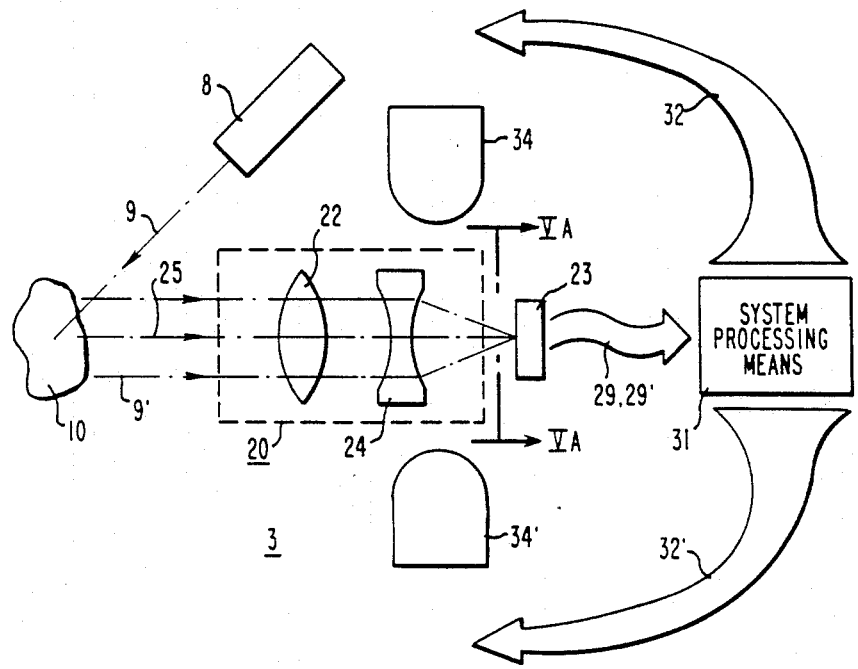
FIG. 5 is a plan view of an active electro-optical tracking loop utilizing a pulsed laser illuminator.

FIG. 5 is an example of an active electro-optical tracking loop 3. In this embodiment, a pulsed laser illuminator 8 is directed towards the target 10. Laser energy 9 is emitted from the pulse laser illuminator 8 in predetermined amounts. This laser energy 9 is directed toward target 10. The laser energy 9 is reflected from target 10 and this reflected laser energy 9' will pass through a receiver telescope means 20. This telescope means 20 has a convex lens 22 and a concave lens 24.

Both lens 20, 22 are aligned upon a common colinear longitudinal axis 25; and are operable to pass the reflected laser energy 9' in the form of a blur circle 27 which will strike the hybrid fine track/coarse track detector 23. This blur circle 27 is found straddling the quadrant 16 and segments 18 of the hybrid detector 23.

Figure 5A:
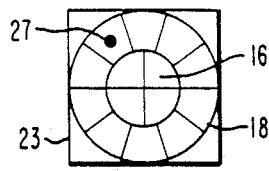
FIG. 5A is cross-section VA—VA, the fine track and coarse track detector array.

FIG. 5A is a cross-section VA—VA of the hybrid detector 23. Centered about the centroid of the detector 23 are the four quadrants 16 and encircling the four quadrants 16 are a mulitplicity of elements forming the coarse track detector array 18. When the blur circle 27 rests upon the detector array 23, optical energy is converted into electrical energy 29 and 29'. The electrical energy generated on the fine track quadrant 16 will result in electrical energy 29 and the electrical energy generated on the coarse track quadrants 18 will generate electrical energy 29'. This electrical energy 29, 29' will enter the fine track coarse track signal processing algorithms 31 of the fine track coarse track detector means 23 and in turn will generate commands 32 and 32' to the gimbals 34, 34' from the signal processing means 31 instructing gimbals 34, 34' of the two axis pointing system as they are interconnected with receiver telescope means 20.

In this active system then, the pulse laser illuminator 8 generates optical energy 9 which when reflected from the target 10 results in reflective laser energy 9' which is gathered and directed towards the hybrid coarse track fine track detector 23 by the receiver telescope means 20.

Figures 6, 6A:
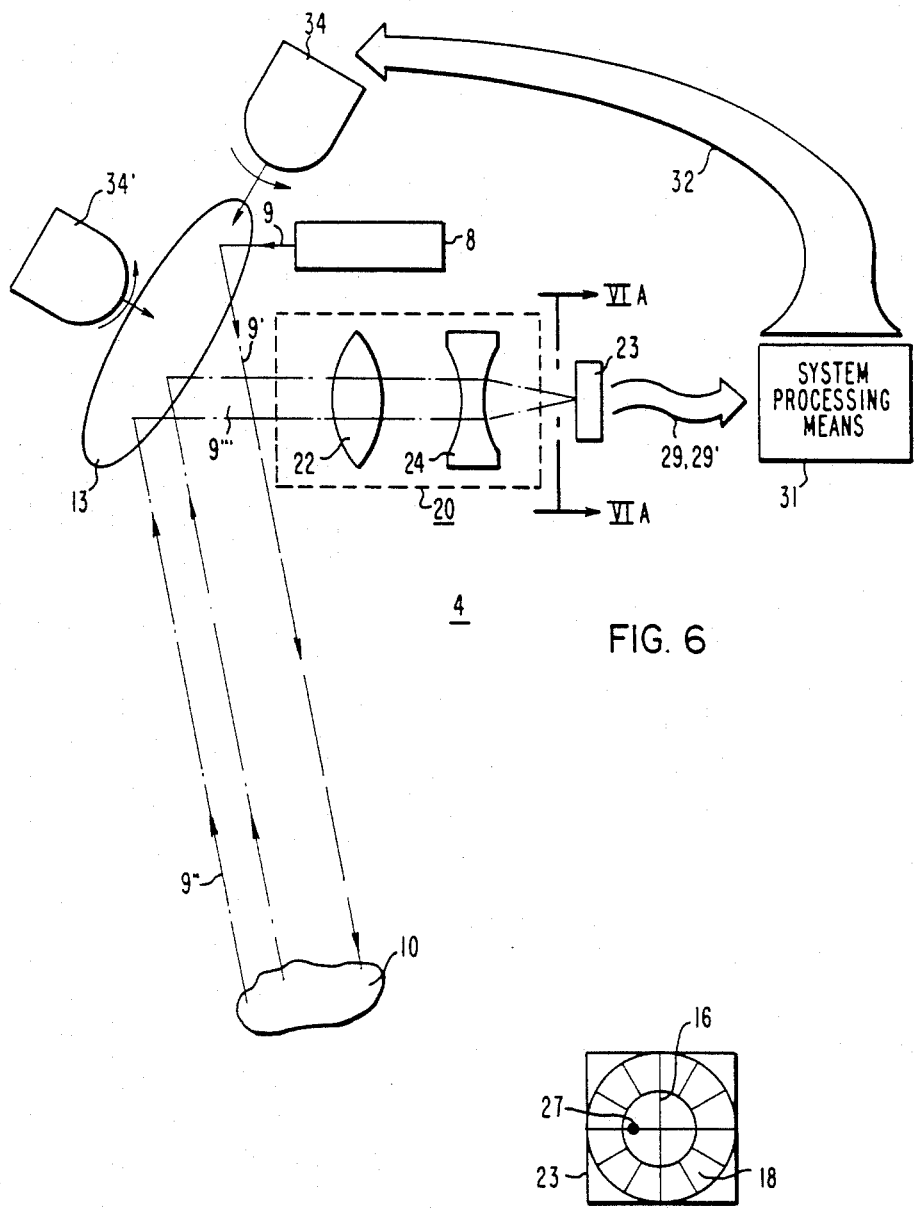
FIG. 6 is a plan view of the combined active reflective electro-optical tracking loop utilizing a pulsed laser illuminator and reflective means.
FIG. 6A is cross-section VIA—VIA which is a fine track coarse track focal plane detector.

FIG. 6 is an active-reflective system 4, where active pulse laser illuminator 8 generates optical energy and by utilizing reflective means 13 detection of a target 10 is achieved. The pulsed laser illuminator 8 generates a beam of optical energy 9 which is reflected on a reflective means 13. This energy 9' reflected from reflective means 13 will strike the target 10 and in turn be reflected back towards the reflective means as reflected laser energy 9''. This reflected energy when reflected again from the reflective means 13 will become twice reflected optical energy 9''' which will be directed towards a receiver telescope means 20. This receiver telescope means 20 will comprise a convex lens 22 and a concave lens 24. The electro-optical energy 9''' will pass through these receiver telescope means 20 and strike a fine track/coarse track hybrid detector array 23.

FIG. 6A is a cross-section of the VIA—VIA of the focal plane detector array 23. A blur circle 27 will lie upon the fine track quadrants 16 or the coarse track elements 18. The fine track quadrants 16 are positioned about the centroid of the detector array means 23. The coarse track elements 18 encircle the fine track quadrants 16. Electrical energy 29 and 29' generated from the optical energy 9''' received by receiver telescope 20. This electrical energy 29 and 29' from the fine track and coarse track detector elements respectively, will enter a fine track coarse track signal processing means 31 where the signals 29, 29' will be converted using mathematical algorithms to directional commands 32 to the two-axis gimbal system 34 and 34' which is interconnected to the reflective means 13. This active-reflective system electro-optical tracking system 4 will then be operable to keep a target within sight of the reflective means 13 utilizing the algorithms, receiver telescope and two axis gimbal system.

Figure 7:
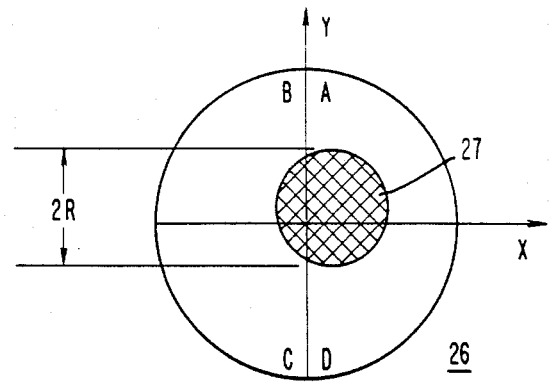
FIG. 7 is a plan view of the fine track detector array as known in the prior art.
Figure 8:
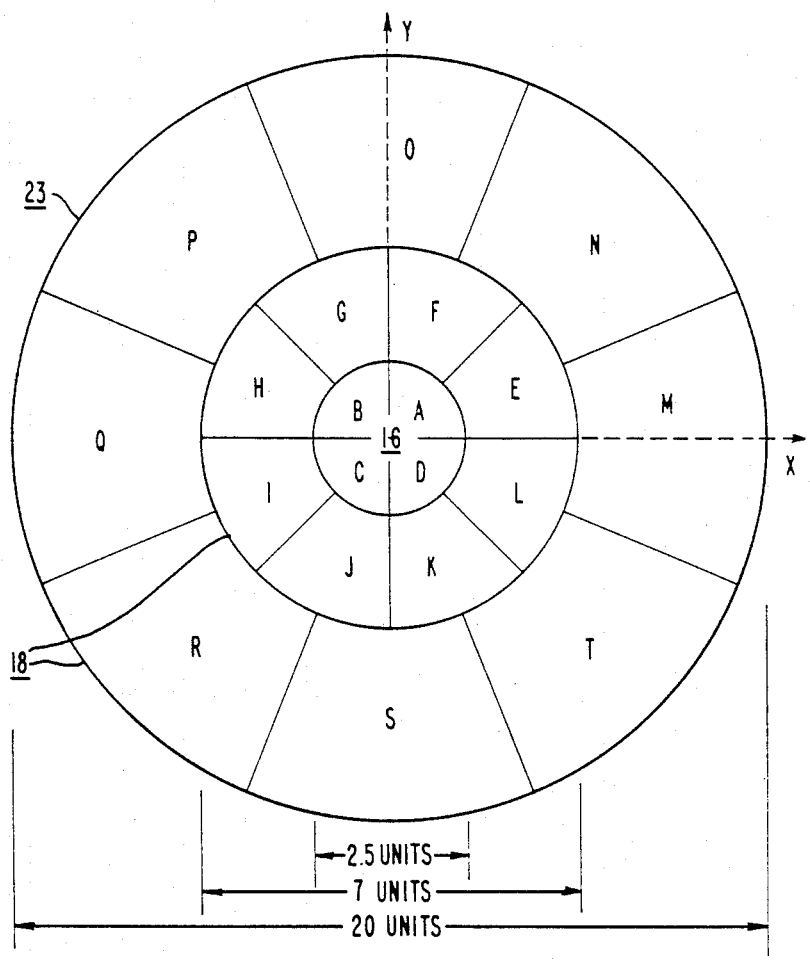
FIG. 8 is the a plan view of the combined fine track coarse track detector array in all quadrants.

FIG. 7 is an example well known in the prior art of a four quadrant detector array. These quadrants have been labeled A, B, C and D and they radially abut each other about the centroid of the detector array 26. A blur circle 27 is shown striking the four quadrant focal plane array 26. This blur circle straddles quadrants A, B, C and D. In this example of the prior art, the four quadrant detector array 26 is situated upon a cartesian coordinate linear plane with a predesignated X and Y coordinate system. The recommended dimension of the blur circle as demonstrated on the FIG. 7 would be 2R where R is the radius of the blur circle. FIG. 8 is a plan view of the coarse track/fine track detector array hybrid 23. This hybrid 23 combines the fine track quadrants 16 which are located about the centroid of the detector array with quadrants A, B, C and D. The coarse track detector element rings are labeled in this plan view as E through T. If a blur circle 27 were to strike a fine track element quadrants A through D, only an address system would be energized and read by the signal processing means 31. If, however, quadrants A and F were illuminated immediately to the right of the X axis and the A quadrant address system, then the hybrid recording algorithm would classify the discrete addresses as used in this quadrant cell A and discrete addresses used in a quadrant cell where only one element is illuminated, there would be no proportional information.

The hybrid of the coarse track algorithm which uses discrete processing and fine track algorithm using continual processing is unique to this invention. In FIG. 8, the relationship proportionally between the fine track, the diameter of the fine track quadrants 16 A through D, the first concentric ring E through L and the second concentric ring M through T is shown just beneath the combined coarse track/fine track detector 23. These recommended proportional dimensions of the rings are 2.5, 7 and 20 where the proportion between the fine track quadrants A through D is 2 compared to the proportion of the first coarse track concentric detector array E through L and the second segments M through T.

Figure 9:
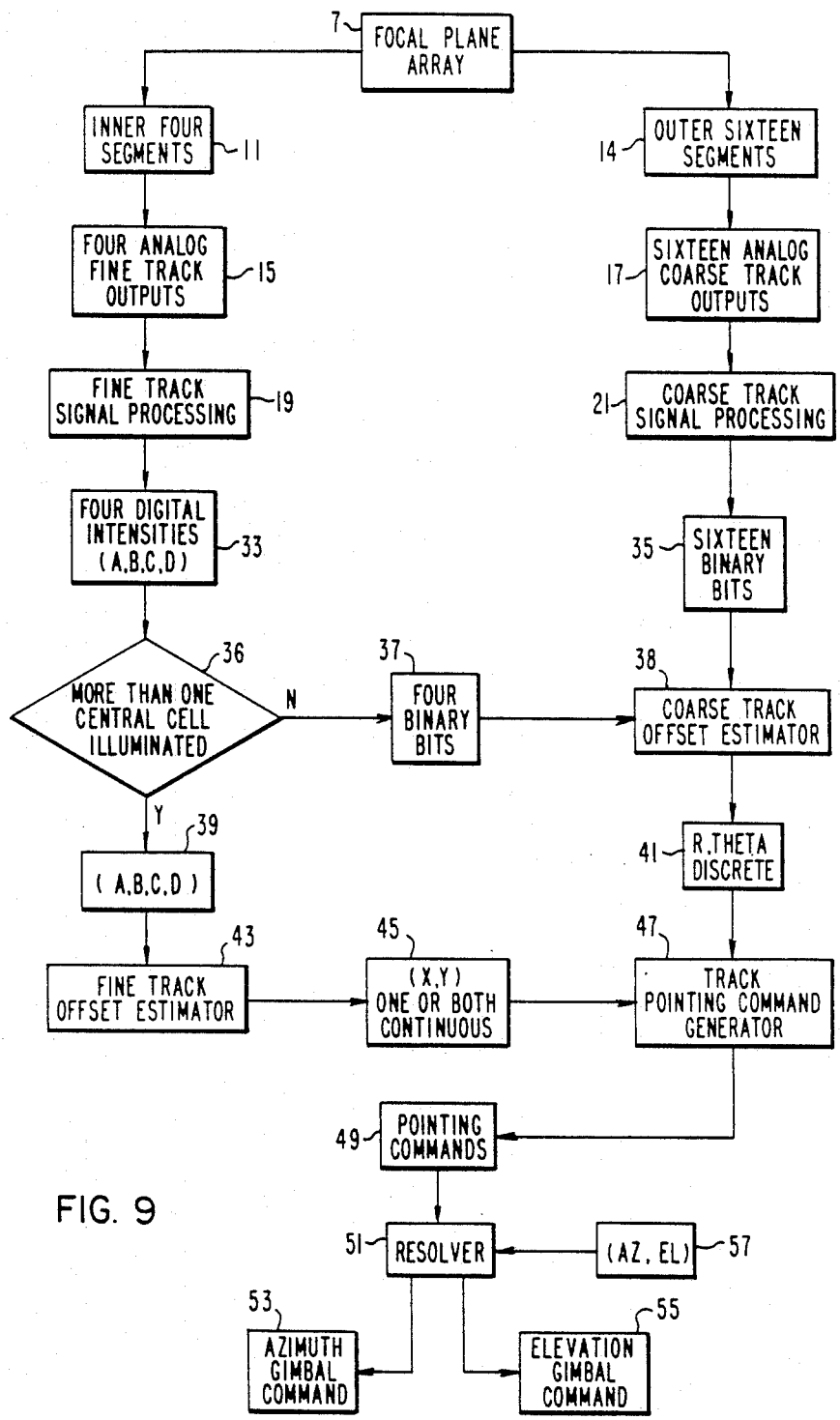
FIG. 9 is a flow chart of the overall analysis methodology for the 16 segment coarse track and four quadrant analog fine track focal plane array.

In FIG. 9, in the flow chart of the coarse track/fine track algorithms, when the threshold exceeds the range gate, it is possible to make a qualitative measurement of the return intensity with a sample and hold circuit which is triggered on the threshold transition. If the target's blur circle 27 of finite angular extent straddles two or more detector elements, then a continuous interpolation algorithm may be used to estimate the location of the image centroid. This approach would be utilized in a conventional four quadrant cell as illustrated in FIG. 7.

In FIG. 7, the intensity measured by the four detector elements (A, B, C and D) is used to compute two differential outputs:

$$H=(A-B-C+D)/(A+B+C+D)$$

$$V=(A+B-C-D)/(A+B+C+D).$$

If in FIG. 7 when R, the radius of the target's blur circle 27 is known, then it is possible to estimate (X, Y) the vector offset of the blur circle 27 centroid from the vertex of the quadrant cells A, B, C, D: where $$X=(\text{Constant})\times H, \ |H|<1$$

$$Y=(\text{Constant})\times V, \ |V|<1$$

These relationships which are valid whenever $|H|$ and $|V|$ are significantly smaller than 1 permitting X and Y to be resolved with the precision which is fine in comparison to the radius R.

The major alternative to the quantitive processing described above is threshold processing. The output from each cell is a binary one if that cell experienced a threshold exceedance within the range gate and a binary zero otherwise. Whenever an isolated detection is made (i.e., a detection unaccompanying by detections in adjacent elements), the target's estimated position is the centroid of that element. Whenever simultaneous detections are made in adjacent elements, then the target's estimated position is the centroid of the common boundary between the elements. The output of the detector array is one of the discrete addresses.

This threshold processing concept has the advantage of simplicity. It eliminates the need for a sample and hold circuit and the mechanism required to compute (H, V). When the blur circle 27 lies entirely within one element, for example A, threshold processing is as accurate as quantitative processing. When the blur circle straddles elements, for example AB, then threshold processing is less accurate.

Threshold processing introduces quantization error because of the discrete nature of the addresses and this minimum value of quantization error, QE, is:

$$QE > S/\sqrt{12}$$

where S is the displacement between the adjacent addresses.

The preferred embodiment as demonstrated in FIG. 8 utilizes hybrid data processing algorithms to make an assessment of the position of the target blur circle. Whenever the amplitude of the sum (A+B+C+D) exceeds the threshold within the range gate, then H and V are computed using the equations:

$$H = (A - B - C + D)/(A + B + C + D)$$

and $$V = (A + B - C - D)/(A + B - C + D).$$

If the components of these equations are satisfied:

$$|H| < 1 - N$$

$$|V| < 1 - N.$$

Then the following equations are used to calculate the cartesian coordinates (X, Y) of the offset (i.e., cells A, B, C and D operate as a conventional quadrant cell):

$$X = (Constant) \times H, \quad |H| < 1$$

$$Y = (Constant) \times V, \quad |V| < 1$$

where in the above calculations, N is a small fraction introduced as a margin for noise.

If only one component of the equations:

$$|H| < 1 - N;$$

and $$|V| < 1 - N$$

are satisfied, then the corresponding components of X and Y are used to compute one coordinate and a discrete estimate is made for the other coordinates as described in the following table:

TABLE I

| FINE TRACK OFFSET ESTIMATES (N = 1/16) | | | |
|---|---|---|---|
| Fine Track Outputs | Cells Lit | x | y |
| $|H| < 15/16$, $V715/16$ | A,B | Continuous | +0.50 |
| | A,B,2,3 | Continuous | +1.25 |
| $H < -16/16$, $|V| < 15/16$ | B,C | −0.50 | Continuous |
| | B,C,4,5 | −1.25 | Continuous |
| $|H| < 15/16$, $V < -15/16$ | C,D | Continuous | −0.50 |
| | C,D,6,7 | Continuous | −1.25 |
| $H > 15/16$, $|V| < 15/16$ | D,A | +0.50 | Continuous |
| | D,A,8,1 | +1.25 | Continuous |
| $|H| < 15/16$, $|V| < 15/16$ | A,B,C,D | Continuous | Continuous |

If (A+B+C+D) does not exceed its threshold, or if neither component of the equations used to calculate $|H|$ and $|V|$ are satisfied, then a discrete estimate of the target offset is selected. In this latter case, only one of the fine track cells A through D is lit (for example, cell B is lit if $H < -(1-N)$ and $V > -(1-N)$). There are 80 discrete addresses on the array and they are expressed in polar coordinates. FIG. 14 of this application shows the 80 coordinates as they would appear on the hybrid detector array.

FIG. 9 is a flowchart diagram which explains the process or methodology for the boresighting algorithms for coarse track and fine track. The focal plane array 7 which is the preferred embodiment of this invention would have a four segment inner quadrant section N, 15, on the field array surrounded by an outer 16 segment array 14. The fine track signal processing would have four digital intensities A, B, C and D 33. The coarse track signal processing 21 would have 16 binary bits 35 one for each element in the coarse track detector array. If more than one central cell of the detector array were illuminated 36, then the fine track offset estimator 43 would be employed in the X or Y direction 45. Either one or both continuous such that a conventional fine track generator would elicit X and Y commands to the resolver 51 and would in turn provide azimuth gimbal commands 53 or elevational gimbal commands 55 to the boresight pointing mechanisms.

If, however, there were not more than one central cell illuminated, then the four binary bits 37 would feed into the coarse track offset estimator 38 whereby an R or $\theta$ would be discrete in nature and would be determined and a coarse track pointing command generator 47 would issue with this R and $\theta$ command into the resolver 51 in terms of azimuth and elevation commands 57 which in turn would provide azimuth gimbal commands 53 and elevational gimbal commands 55 to the two-axis gimbal pointing system. R would be the distance from the origin and $\theta$ would be the angle measured counterclockwise from the X axis. Further, FIG. 9's flowchart indicates how the presence of multiple targets could be determined. Detections in two or more non-adjacent coarse track cells would result from the computation of the diagonal differential sum of the fine track intensities where: $D1A = (A - B + C - D)/(A + B + C + D)$, and if these two targets are situated in diagonally opposite cells, then:

$$D1A < |H| \text{ and } D1A > |V|.$$

The rate correction process establishes an estimate $\dot{R}_N$ 97 of the radial rate error and this estimate is updated whenever the position correction process fails whereby:

$$\dot{R}_{N+1} = \frac{r_{N+1} - \hat{r}_{N+1}}{\Delta T_{N+1}} + \dot{R}_N$$

Here $\hat{r}_{N+1}$ is predicted radial error for the detection period after the last position correction and $r_{N+1}$, the actual measured radial error and $\Delta T_{N+1}$ is the time between the start of the previous position correction corresponding to $r_N$ and the current time corresponding to $r_{N+1}$.

A radial velocity correction is then computed. $\Delta \dot{R}_{N+1} = \partial(\dot{R}_{N+1} - \dot{R}_N)$ where $\partial < 1$. Next, an angle change is computed where:

$$\Delta \theta_{N+1} = \begin{cases} \theta_{N+1} - \theta_N \\ \theta_{N+1} - \theta_N > \pi/2 \end{cases}$$

0 or otherwise 98. Angle changes less than 90° are ignored and an angle rate magnitude computation 98, 100 is also performed where:

$$|\dot{\theta}_{N+1}| = \frac{2r_{N+1}\sin}{\theta T_{N+1}} |\Delta \theta_2|$$

A sign indicator is also determined 103:

$$N_S = \begin{cases} 1 & \theta_{N+1} < \theta_N \\ -1 & \theta_N < \theta_{N+1} \end{cases}$$

The angle at which to apply the angle rate correction 102 is computed:

$$\theta_C = \theta_{N+1} + N_s \times \left[ \frac{\Delta \theta_{N+1}}{2} + \frac{\pi}{2} \right]$$

The radial and angle rate corrections are then resolved into orthogonal coordinates and applied to the gimbals as rate changes 104:

$$\Delta \dot{X}_N = \Delta \dot{R}_{N+1} \cos(\theta_{N+1}) + \alpha |\dot{\theta}_{N+1}| \cos \theta_c$$

$$\Delta \dot{Y}_N = \Delta \dot{R}_{N+1} \sin(\theta_{N+1}) + \alpha |\dot{\theta}_{N+1}| \sin \theta_c$$

The first and last terms of these equations represent the radial and angular velocity changes, respectively. The character $\alpha$ is a gain coefficient such that $\alpha < 1$ and the angular rate correction is required to keep the detector from spinning with respect to the target. The angular quantizations of the detector are somewhat coarse. Thus, the angle correction is used only for gross errors and this process is used to locate and stabilize the target return straddling the central quadrant. Transfer of the gimbal control is made to the fine track algorithm.

Figure 11:
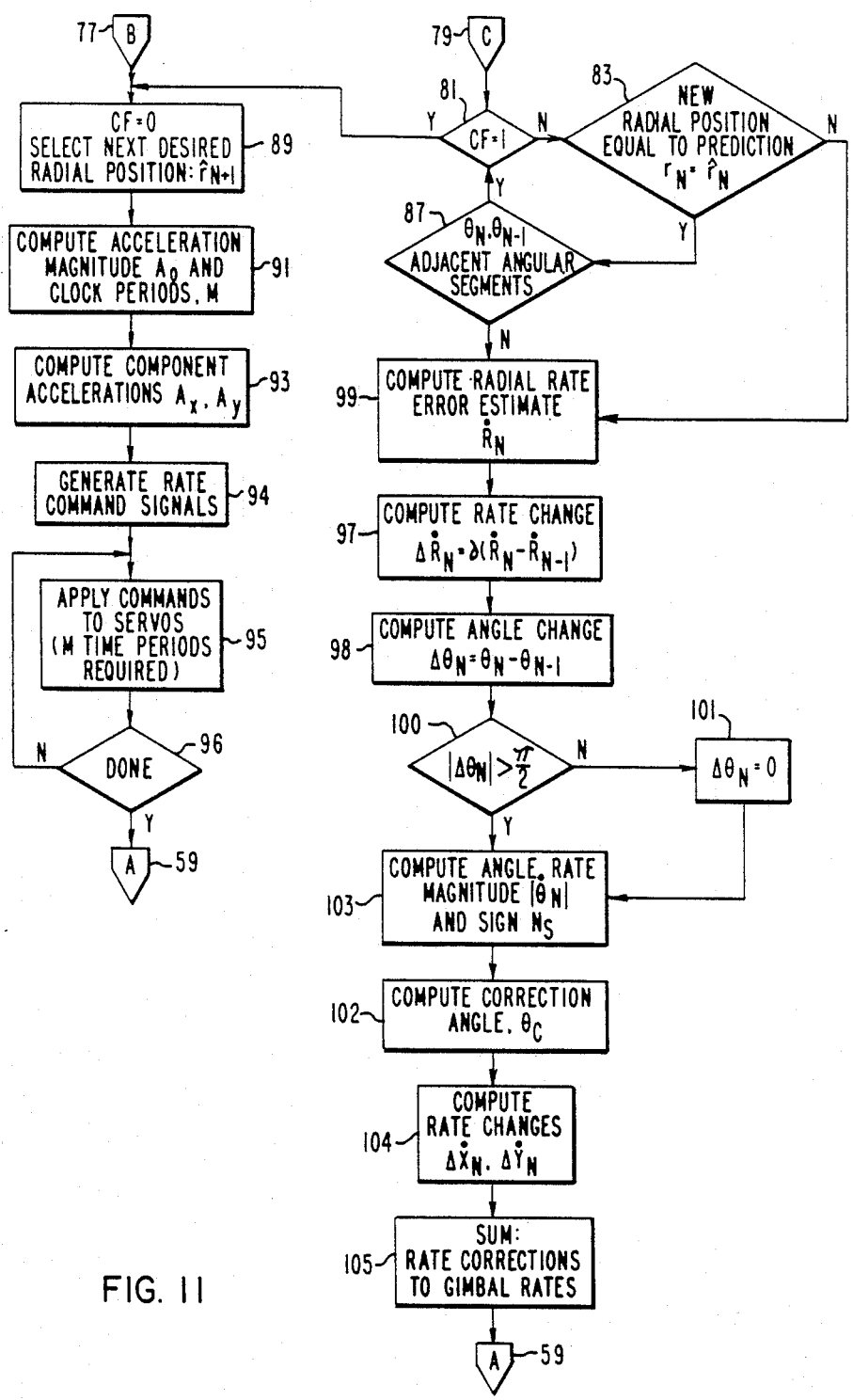
FIG. 11 is a further flow chart of the array processing algorithm.

FIG. 11 describes in detail the flow chart process necessary to implement these equations to resolve utilizing the coarse track and fine track algorithms.

FIG. 12 is a circuit schematic for the coarse track processing algorithm. The circuitry of the algorithm 40 encompasses an incoming signal 29 from the hybrid detector array system. This signal comes in on terminal 42 and is compared to a threshold voltage on terminal 48. There will be for the coarse track detector elements a single comparator for each element. Comparator 46 makes a determination which signal the threshold voltage on terminal 44 where the incoming coarse track signal 29 on the terminal 42 is the higher.

Signal 29 exceeds the threshold voltage on terminal 44. Then a digital signal "1" is generated at the output of that circuit. The threshold at terminal 44 can be threshold dependent. The voltage can be lowered as a function of time to account for the fact that a more distant target will have a weaker return than a nearby target. In a hybrid processor utilizing 16 coarse track elements, there will be sixteen comparators 46, one for each of the detector elements.

The output signal 1 goes to the range counter 50. The range counter 50 is initiated in the case of an active laser system when the laser fires. A clock 48 begins counting and it counts with time in increasing numbers until a return is received. A return stops the counter and the range is read out based upon the stopped counter. The digital word is in the clock and in the register and that results in the range for the particular target. The lead 52 that initiates the counter will indicate when a signal has been detected. When a signal is received, the counter is stopped. That counter stores a number proportional to the transitions which have occurred in the input clock 48 which is proportional to the time between the exit pulse and the return pulse. The "time of flight", or how long it took for the signal to occur is determined from this proportionality. The signal and the range is directly related to the speed of light. The range gate 54 is the readout 15 detected. And, it is a series of digits rather than a single bit. It is a binary word. It's this binary word that goes into the processor and tells the range of the target and what the detection is.

This threshold detection system can include a range gate. In other words, this detector is not operated unless operated at a minimum range expecting the target to be or stopping at a maximum range. Outputs are not accepted in any other basis. The logic in system 40 is simply a latch mechanism 56 which is reset to zero when a laser is fired, for example, in an active system. Firing the laser puts the pulse on reset lead 52 to a logical "one" that resets the counter 50 to zero. This output found at lead 58 is read equal to zero. It is turned off shortly thereafter before it is entered into the range gate where the target is expected to be. When the threshold is exceeded, then the output of the comparator 46 is a one and the NAND gate 60 within the latch 56 is a zero. The NAND gate then becomes a one and that goes into the OR gate 62 giving a one at output 58. 52 is zero so that the NAND gate 60 will produce a one on the NAND gate 64 and that it latches 56 and the OR gate 62 so that the output 58 stays one until it is read out and after it is read out, reset can be achieved by either using another laser pulse or another mechanism.

The circuit in FIG. 12 is a pulse stretcher enabling the processing which follows the coarse track detection sufficient time to actually recognize the pulses. If a laser pulse is too narrow on the input signal 29 coming to the incoming coarse track signal input lead 42, the processing would not even see it. Latch 56 sets it to one and holds it there until it has an opportunity to respond. If this were a passive system instead of an active laser-initiated system, a monostable multivibrator would be utilized to give a fixed pulse width of sufficient length to be read.

When multiple targets are detected, the data processing algorithm can be augmented so that one target is uniquely identified and its estimated coordinates alone are reported to the tracking algorithm while their targets are ignored. These targets would be prioritized by their geometry.

For example, the target line furthest to the right may be the one target tracked first. This priority may be reversed upon command while lying the system to track a second target. The pointing command generator operates in either one of two modes, coarse track or fine track. In the coarse track mode, a system receives discrete estimates of the target's offset and polar coordinates. A novel method is then used to process data in the coarse track mode and when the target straddles the four fine track cells A through D. In that instance, a conventional fine track algorithm is used to generate the pointing commands.

In order to acquire the centroidal target within the fine track array, it is necessary to make the angular velocity of the pointing system match that of the target and also to maintain a zero offset in that position. After evaluating each pulsed return, the pointing command generator issues either a command to correct the angular rate or command to correct the position. The choice of which type of command to issue is adaptive based upon the success of the previous commands.

The process would begin by correcting position errors and rate errors when the evaluation of successive returns indicates that a rate error must be present when the offsets are measured or successive returns are not consistent with the zero rate error.

These commands are generated in the coordinates of the detector array. To control the pointing system, it is necessary to resolve the offset or rate error vector into components defined by the gimbal axes. If the receiver is mounted on a double-gimbal platform, then the relationship between the gimbal axes and the array axes is fixed. If the receiver, however, is mounted off a gimbal platform as illustrated in FIGS. 4 and 6, then the gimbal coordinate system can rotate with respect to the detector axes. It is necessary then to determine the angle of one or both gimbals by conventional resolvers or encoders and to perform the appropriate rotation.

The translation of binary threshold data is a discrete position prediction expressed in polar coordinates and corresponds to centroids of cells in which the detector occur or of common boundaries of adjacent cells in which multiple detections may occur. Data from innermost quadrant cells in the conventional quadrant cell processing where the blur is centered on a detector's vortex and is digital threshold data otherwise identification of multiple targets within the field of view by detectors in nonadjacent cells.

Identification of multiple targets in the fine track quadrant cell array by comparison of the normalized cross-term magnitude D1A with $|H|$ and $|V|$ where $D1A = (A - B + C - D)/(A + B + C + D)$.

The pointing command generator has two functions. The position of the target return within the detector array must be moved into the central quadrant. The other function is to reduce the relative angular velocity or rate error between the target and the tracking gimbal. The latter is done to keep the relative position of the target spot from drifting across the surface of the detector. The drift error must be reduced such that the spot or blur circle remains within the central quadrant long enough for the fine track process to be initiated. The pointing command generator as described is intended to be operated with a rate integrating gyro forming the pointing system. The commands thus generated take the form of rate changes regardless of whether their purpose is to translate the position of the spot or blur circle or adjust the angular velocity of the gimbal.

Figure 10:
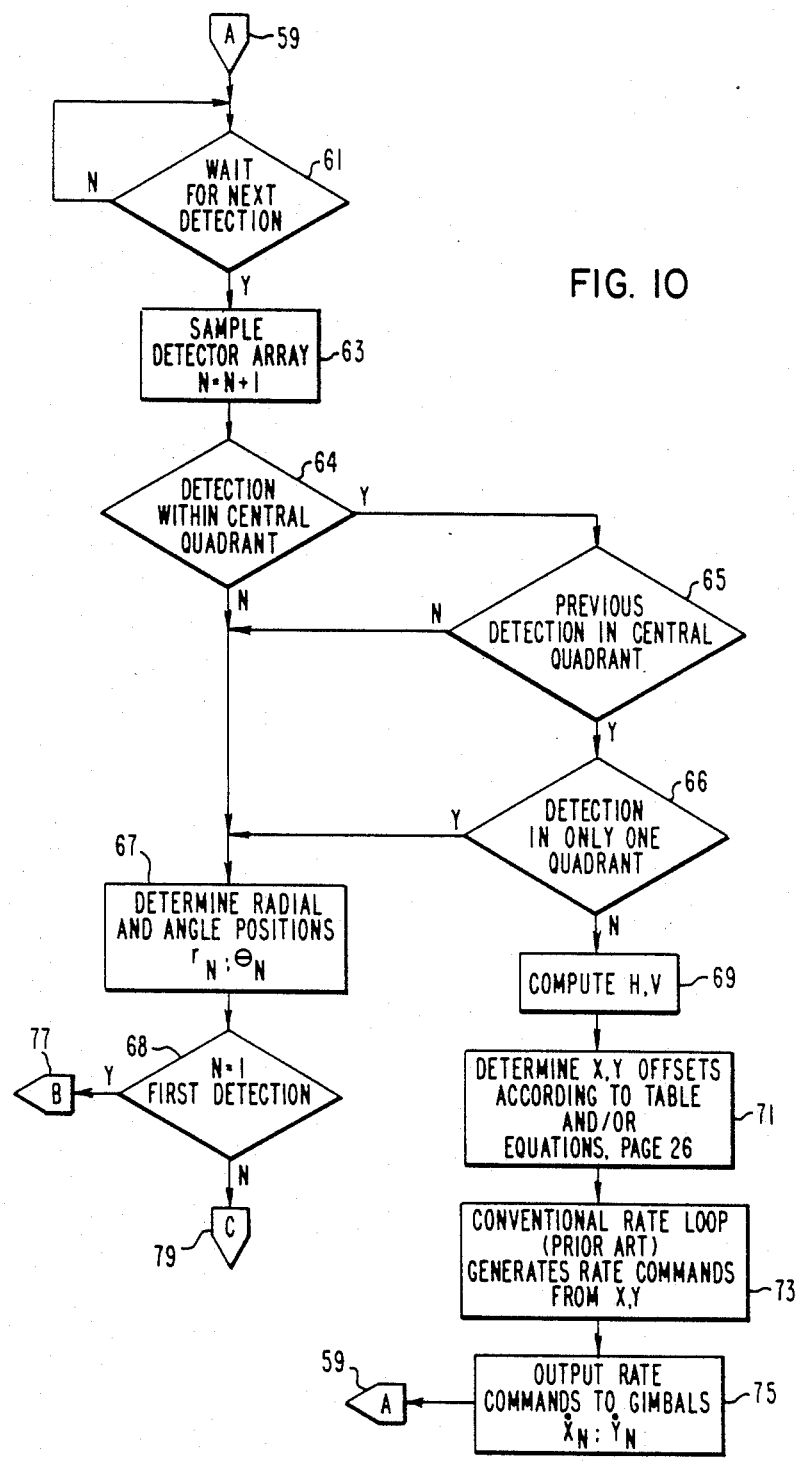
FIG. 10 is the flow chart of the array processing algorithm.

In FIG. 10 we see that the process of issuing pointing commands is an adaptive one. After each pulse return the pointing command generator issues either a command to correct the angular rate 67 or a command to correct the position 94. FIG. 10 is a flow chart of the overall command generation process 77-104. When a target return pulse is detected 61, a test is made to determine if the return is centered within the quadrant cell 63. If the test is successful, the coarse track process, is terminated and the fine track process is commenced.

The coarse track process begins by correcting position errors. A command is generated to translate the target return to a new position 75 within the detector array. On subsequent pulse periods, the measured position is determined by the position report generator is compared to a desired or predicted position selected when the command was generated. If the values are equal, a new position is selected and the position command generation process continues.

Position commands are continually generated as long as the process is successful. Should the measured position of the return signal not agree with the desired or predicted position after the execution of a positive change command, then a rate change command is computed in chute to the gimbal.

Note that the logic of command generation process dictates that a position correction be attempted after each rate correction command.

In FIG. 11 the position command generation process results in the angular acceleration and ultimately rate profiles 89. The command is applied over a period of 2M clock cycles where typically there are four clock cycles for each target return pulse. The first steps are to determine the amplitude A and duration 2M of the acceleration profile 91. The position report generator provides radial, $r_N$ and angular, $\theta_N$ position estimates of the location of the blur circle relative to the center of the detector array. A new desired radial position $r_{N+1}$ for the location of the target for the next detection period is selected where $r_{N+1} = \beta r_N$ where $0 \leq \beta \leq 1$. It is necessary to limit the acceleration amplitude in order to preserve linearity of the gimbal response. Should the number of clock cycles 2M exceed the time period between target detection and any measurements of target location will be ignored during the application of the rate profile corresponding to the acceleration.

The acceleration is adjusted for angular location and resolved into the two-axis coordinate system: $A_X = A_o \cos \theta_n$ and $A_y = A_o \sin \theta_N$, 93. These are integrated and applied to the profile.

The next radial and angular error measurements are $r_{N+1}$ 97 and $\theta_{N+1}$ 98 occur on the pulse detection period immediately following completion of the previous command. If $r_{N+1} = \hat{r}_{N+1}$ and $\theta_{N+1} - \theta_N$ does not exceed more than one angular increment, then the position correction (the radial and angular measurements are quantized by the position report generator) process is deemed to have succeeded. This position correction process is then reiterated. Should the process have failed, then the angular rate of the gimbal is adjusted by a rate correction process.

Figure 13:
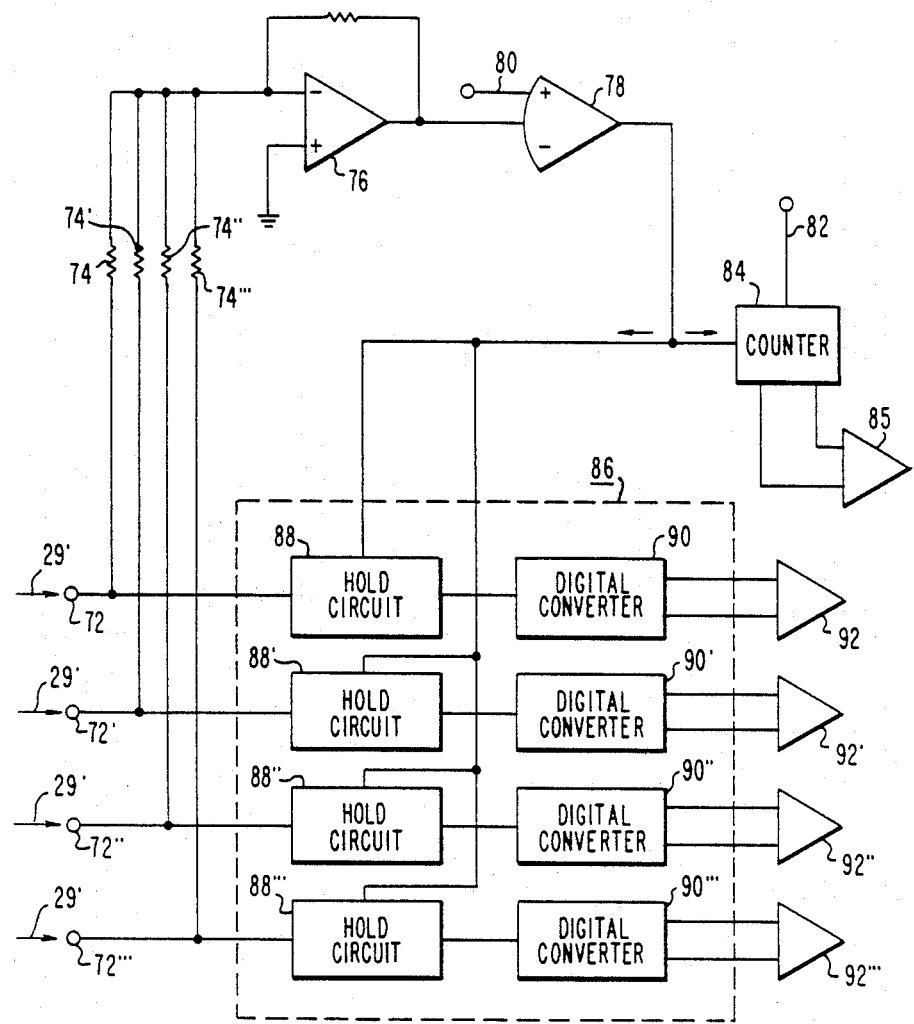
FIG. 13 is the schematic drawing fine track signal processing circuitry of the fine track detector array.

FIG. 13 is a circuit schematic of the preferred embodiment for the fine track signal processing algorithm. Inputs from the A, B, C and D quadrants of the fine track sector of the hybrid detector array would produce signals. These input signals 29' would enter through the individual input lines 72, 72', 72" and 72'" corresponding respectively to quadrant sectors A, B, C and D. The input signals would pass through a resistor 74, 74', 74" and 74'", respectively. The resistors would convert the signal to a voltage that would be amplified in the operational amplifier 76. The resultant signal from the operational amplifier 76 would then go into a comparator 78 where it would be compared to a threshold voltage coming in from line 80. This would be a predetermined threshold signal. The compared signal exiting from the comparator 78 would be split between the sample hold circuit block 86 and the counter 84 and it will serve as a clock signal for the counter 84, clock signal 82. This clock signal would be initiated by an emission of a laser pulse in an active system. The four sample and hold circuits 88 through 88'" will be initiated by the signal coming from the comparator 78. Those circuits will sample the analog voltage coming in and hold that voltage until they are reset. So as soon as the trigger is initiated, they will hold whatever voltage is in there at that time and maintain it. Located in connection with them are the analog to digital converters. They will convert the whole digit to a digital word and a number which is proportional to the voltage. All of these items will be reset after the signal is processed. The outputs for these four cells coming out of range gates 92 through 92'" are four digital words.

In way of example to describe this circuit in FIG. 13, we will utilize the illumination via blue circle 27 in quadrant A of the fine track four quadrant inner cell 16 of the hybrid quadrant array 26. If quadrant A is illuminated, there will be sufficient energy to trigger the resistors to make a voltage high enough that can be amplified by the operational amplifier 76. If it exceeds the comparison between a threshold voltage coming in on line 80 within the range gate, comparator 78 will output a digital 1. This is split into five branches. One branch goes to the counter 84 which was initiated by the signal 82 which occurred when the laser pulse was sent out. This counter is now stopped and the fixed number in there is proportional to the time of flight of the laser pulse which in turn is proportional to the range and that is the laser readout with a digital word shown at the range gate 85. Now concurrent with this, we have from the comparators 78 a signal which will trigger the sample and hold circuits 88 through 88'" and the analog to digital converters 90 through 90'". This digital 1 at the intersection point between the counter 84 and the sample and hold circuit sector block 86 will cause all four sample and holds to latch at the same time. It's important that they do latch at the same time to make a quantitative inner comparison between the relative intensities. There is a requirement that the circuitry of the four sample and hold circuits 88 through 88'" respectively have identical gain and bandwidth and other properties so that they will not distort the signals coming in. It might be possible to convert the four signals coming from the analog to digital converters to a single one but this is a matter of the preferred embodiment. The net output coming out of the four range gates 92 through 92'" will be four digital words and these will be proportional to the intensities of the input signals from quadrants A, B, C and D.

Any combination of inputs on quadrants A, B, C or D will cause the initiation of this process. Any combination of signal coming in on any one or any two of them, three of them or four of them, when you have a target perfectly in the center of the quadrant is when you will get the most optimal readout and any combination of inputs will use this same process.

FIG. 14 is another view of the hybrid signal processing detector array 23 with 16 fine track quadrants A through D and its 18 coarse track elements E through T. Also shown on FIG. 14 are the discrete addresses which will be utilized during the detection of optical energy. Single addresses may be selected when a single detection occurs in one cell or when multiple detections occur in up to three adjacent cells. The two 22½° offset between the inner and outer coarse track detectors allows additional addresses to be generated or their common boundaries determined. Each addresses is expressed in terms of radial integers NR and angular integer NT. The correspondence between the binary coarse track detection data and the addresses (NR, NT) is presented in the accompanying Table II. The translation of NR into R and NT into $\theta$ is also defined in Table III.

FIG. 14A is a key for the NR component of the hybrid signal processing detector array 23. Each symbol on the key is representative of another NR position upon the radial circumference of the array 23.

TABLE II

DISCRETE ADDRESSES

| Cells Lt | NR | NT | Cells Lt | NR | NT | Cells Lit | NR | NT |
|---|---|---|---|---|---|---|---|---|
| A | 1 | 4 | E,M | 4 | 1 | M | 5 | 0 |
| B | 1 | 12 | E,M,N | 3 | 2 | M,N | 5 | 2 |
| C | 1 | 20 | E,N | 4 | 3 | N | 5 | 4 |
| D | 1 | 28 | E,F,N | 4 | 4 | N,O | 5 | 6 |
| A,E | 2 | 2 | F,N | 4 | 5 | O | 5 | 8 |
| A,E,F | 2 | 4 | F,N,M | 4 | 6 | O,P | 5 | 10 |
| A,F | 2 | 6 | F,O | 4 | 7 | P | 5 | 12 |
| B,G | 2 | 10 | F,G,O | 4 | 8 | P,Q | 5 | 14 |
| B,F,H | 2 | 12 | G,O | 4 | 9 | Q | 5 | 16 |
| B,4 | 2 | 14 | G,O,P | 4 | 10 | Q,R | 5 | 18 |
| C,I | 2 | 18 | G,P | 4 | 11 | R | 5 | 20 |
| C,J | 2 | 20 | G,H,P | 4 | 12 | R,S | 5 | 22 |
| C,J | 2 | 22 | H,P | 4 | 13 | S | 5 | 24 |
| D,K | 2 | 26 | H,P,Q | 4 | 14 | S,T | 5 | 26 |
| D,K,L | 1 | 28 | H,Q | 4 | 15 | T | 5 | 28 |
| D,L | 2 | 30 | H,I,Q | 4 | 16 | T,M | 5 | 30 |
| E | 3 | 2 | H,Q | 4 | 17 | | | |
| E,F | 3 | 4 | H,Q,R | 4 | 18 | | | |
| F | 3 | 6 | H,R | 4 | 19 | | | |
| F,G | 3 | 8 | H,J,R | 4 | 20 | | | |
| G | 3 | 10 | J,R | 4 | 21 | | | |
| G,H | 3 | 12 | J,R,S | 4 | 22 | | | |
| H | 3 | 14 | J,S | 4 | 23 | | | |
| H,I | 3 | 16 | J,K,S | 4 | 24 | | | |
| I | 3 | 18 | K,S | 4 | 25 | | | |
| I,J | 3 | 20 | K,S,T | 4 | 26 | | | |
| J | 3 | 22 | K,T | 4 | 27 | | | |
| J,K | 3 | 24 | K,L,T | 4 | 28 | | | |
| K | 3 | 26 | L,T | 4 | 29 | | | |
| K,L | 3 | 28 | L,T,M | 4 | 30 | | | |
| L | 3 | 30 | L,M | 4 | 31 | | | |
| L,E | 3 | 0 | L,M | 4 | 0 | | | |

TABLE III

INTERPRETATION OF NR AND NT

| NR | R | DERIVATION |
|---|---|---|
| 1 | 0.62 | Half of inner circle radius |
| 2 | 1.25 | Inner circle radius |
| 3 | 2.37 | Average of inner/middle circle radius |
| 4 | 3.50 | Middle circle radius |

TABLE III-continued

| INTERPRETATION OF NR AND NT | | |
|---|---|---|
| NR | R | DERIVATION |
| 5 | 6.75 | Average of middle/outer, circle radius |

Theta = π (NT)/16

Target addresses are prioritized by projection onto a predetermined axis. For example, the target line farthest to the right may be tracked first. When multiple detections are interpreted as two or more targets, only the addresses of the highest priority target is reported to the pointing command generator. When the presence of multiple detections is first detected, the offset of the highest priority target is used to change the position estimate, but not to change the velocity estimate. The priority may be reversed upon command causing the system to break track on the first target and to track a second target. The system may detect a second target in one cell while it is tracking the top priority target in the central quadrant. Upon command, the system reverses its priority direction to left instead of right and begins to track the second target by offsetting its position to the centroid of the cell. It subsequently ignores detections from the opposite cell so the original target will not be re-acquired.

In FIG. 14, for example, if one or more of the fine track cells were illuminated, and adjacent cells in the inner coarse track ring are illuminated, and we can reference this back to FIG. 8 which describes the quadrants A through D and E through T. If A and F are both eliminated, then both will report detections. The range in an actual system would make sure that they were consistent, they were close enough within the target of the instrumentation to be from the same target. Discrete addresses which is the square in the first quadrant of FIG. 14 to the right of the Y axis on the same line as (address 5, 6) but much closer as an extension of the line as you move it toward the center. The blur circle would be located and that would indicate where our target was. This would be determined using a discrete algorithm wherein the quad cell is a continuous device. It gives proportional outputs and use it here, as a digital device because of the lack of sufficient data. A series of rings can be formed moving from the inner quadrant A through D to the periphery between the two coarse track radii of quadrants.

When only one of the four fine track cells is illuminated, a discrete algorithm is used. If the inner and outer cells are illuminated, then one of the squares on ring 2, the NR square is chosen. If only one fine track cell is illuminated and no inner ring coarse tracks are illuminated, then we'd pick one of the four triangles on the innermost four quadrants. If two adjacent cells were illuminated, say, for example, A and B, then we would use a continuous algorithm to determine the X coordinate. However, the Y coordinate cannot be determined continuously to make an estimate. If cells G and F are not illuminated, then we must just estimate at the 0.5 blue circle diameter and we move roughly to the point on the blue circle where we hope to center on the next illuminated line. If there is illumination of cells G and F and A and B, a combination of coarse track and fine track and the target's images straddling the boundary, then a continuous algorithm is used to measure X and report a discrete address which is 0.125 and in this case, equal to the radius of the inner ring. So, it indicates the target is at the vertex and the image moves down.

The advantage of using the hybrid detector array in this configuration is that it uses position correction with the outer coarse track array in itself. It is of a coarse track process and it does not rely on fine estimates of where the target is in order to correct for rate. A very precise estimate of the true position of the target is necessary to use a position correction to get the target image into the center of the four quadrants. Once it is in the center, quadrants rate error can be generated. Once the coarse track algorithm has the correct position rate correction scheme, then the target image enters into the center quadrants for two or more counts. Transition to a more conventional algorithm for generating the gimbal's positions using the offset of the centroid of the return in the center of the four quadrants is maintained.

Numerous drawings shall be interpreted as illustrative and not in a limiting sense. Variations may be made in the above-described combination and different embodiments of this invention may be made without departing from the spirit thereof. Therefore, it is intended that all matter contained in the foregoing description and in the accompanying drawings shall be interpreted as illustrative and not in a limiting sense.

We claim:

1. A passive electro-optic tracking system for measuring the angular displacement of a target relative to the tracking system boresight comprising:

a wide field of view optical detector means disposed along the boresight of said system further comprising a central fine track detector array portion of at least four quadrants and at least one concentric ring of coarse track detector elements about said central quadrant array portion, all of said fine track quadrants and coarse track elements operable to simultaneously receive optical energy emitted from said target and further operable to convert said received emitted optical energy into electrical energy;

a signal threshold processor means comprising a coarse track signal processing means coupled to said coarse track detector elements, said processor means operable to analyze said electrical energy generated from said emitted optical energy from said target and further comprising a fine track signal processing means coupled to said central fine track quadrant array portion said fine track signal processing means operable to analyze said electrical energy produced from said optical energy striking said fine track quadrant array portion;

a receiver telescope means positioned on a common colinear axis with said optical detector means, said telescope means operable to receive said optical energy emitted from said target and further operable to direct said optical energy towards said optical detector means;

a two axis gimbal pointing system interconnected to said receiver telescope means comprising a multiplicity of motor drives, said two axis system operable to reposition said receiver telescope means in relation to said target means;

a command generator means interconnected between said fine track and said coarse track signal processing systems and said two axis gimbal pointing system, said command generator means operable to issue commands to said gimbal pointing system to reposition said receiver telescope means relative to said target means during said tracking system operation.

2. An active electro-optic tracking system for measuring the angular displacement of a target relative to the tracking system boresight, comprising:
   a pulsed laser illuminator means operable to generate a beam of optical energy and further operable to direct said energy within said electro-optic tracking system toward said target;
   a wide field of view optical detection means further comprising an optical detector array disposed along the boresight of said system said optical detector array further comprising a central fine track detector array portion of at least four quadrants, and at least one concentric ring of coarse track detector elements about said central quadrant array portion, all of said fine track quadrants and said coarse track elements operable to receive said optical energy reflected from said target and further operable to convert said received reflected optical energy to electrical energy;
   a signal threshold processor means comprising;
   a coarse track signal processing means coupled to said coarse track detector elements, said processor means operable to analyze said electrical energy generated from said reflected optical energy from said target, and
   a fine track signal processing means coupled to said central fine track quadrant array portion and operable to analyze said electrical energy produced from said reflected optical energy striking said fine track quadrant array portion;
   a receiver telescope means positioned on a common colinear axis with said optical detector means, said telescope means operable to receive said optical energy reflected from said target and further operable to direct said optical energy towards said optical detector means;
   a multi-axis gimbal pointing system interconnected with said receiver telescope means comprising a multiplicity of motor drives, said multi-axis pointing system operable to reposition said receiver telescope means in relation to said target means; and
   a command generator means interconnected between said fine track and said coarse track signal processing systems in said multi-axis gimbal pointing system, said command generator means operable to issue commands to said gimbal pointing system to reposition said receiver telescope means relative to said target means during optical detector operation.

3. A passive-reflective electro-optic tracking system for measuring the angular displacement of a target relative to the tracking system boresight comprising:
   a reflective means positioned on a common colinear axis with said tracking system operable to receive emitted energy from said target and further operable to reflect said optical energy towards said tracking system means;
   a wide field of view optical detector means comprising an optical detector array disposed along the boresight of said system said detector array further comprising a central fine track detector array portion of at least four quadrants and at least one concentric ring of coarse track detector elements positioned about said central quadrant array portion, all of said coarse track and said fine track quadrants operable to receive optical energy emitted from said target reflected off of said reflective means and further operable to convert said received, emitted, reflected, optical energy into electrical energy;
   a signal threshold processor means, further comprising a coarse track signal processing means coupled to said coarse track detector elements, said processor means operable to analyze said electrical energy generated from said reflected optical energy from said target; and a fine track signal processing means coupled to said central fine track quadrant array portion and operable to analyze said electrical energy produced from said optical energy striking said fine track quadrant array portion;
   a receiver telescope means positioned on a common colinear axis within said tracking system between said reflective means and said wide field of view optical detector means; said telescope means operable to receive said reflected optical energy from said reflective means and further operable to concentrate said reflected optical energy from said reflective means upon said optical detector means; and
   a two axis gimbal pointing system interconnected to said reflective means comprising a multiplicity of motor drives, said two-axis gimbal pointing system operable to reposition said reflective means in relation to said target means during said optical detector system operation.

4. An active-reflective electro-optic tracking system for measuring the angular displacement of a target relative to the tracking system boresight comprising:
   a pulsed laser illuminator means operable to generate a beam of optical energy and further operable to direct said energy within said electro-optic tracking system towards a reflective means;
   a reflective means positioned on a common colinear axis with said pulsed laser illuminator means and also with said tracking system, operable to receive said optical energy reflector from said target and further operable to reflect said optical energy towards said tracking system means;
   a wide field of view optical detector means comprising an optical detector array disposed along the boresight of said system and further comprising a central fine track detector array portion of at least four quadrants and at least one concentric ring of coarse track detector elements about said central quadrant array portion, all of said coarse track and said fine track quadrants operable to receive optical energy reflected from said reflective means and further operable to convert said received reflected optical energy to electrical energy;
   a signal threshold processor means including a coarse track signal processing means coupled to said coarse track detector elements, said processor means operable to analyze said electrical energy generated from said reflected optical energy from said target;
   a fine track signal processing means coupled to said central fine track quadrant array portion and operable to analyze said electrical energy produced from said optical energy striking said fine track quadrant array portion;
   a receiver telescope means positioned on a common colinear axis within said optical tracking system between said reflective means and said wide field of view optical detector means operable to receive said reflected optical energy from said reflective means and further operable to concentrate said reflected optical energy from said reflective means upon said optical detector means; and a multi-axis gimbal pointing system interconnected to said reflective means comprising a multiplicity of motor drives, said multi-axis system operable to reposition said reflective means with relation to said pulsed laser illuminator.

5. An optical detector means as in claim 1 where said optical detector is manufactured of silicon.

6. A receiver telescope means as in claim 1 where said telescope means further comprises a convex lens and a concave lens, said convex lens and said concave lens mounted in series on a common colinear axis with said optical detector means.

7. A receiver telescope means as in claim 2 where said telescope means further comprises a convex lens and a concave lens, said convex lens and said concave lens are both mounted in series on a common colinear axis with said optical detector means.

8. A receiver telescope means as in claim 3 where said telescope means further comprises a convex lens and a concave lens, said convex and said concave lenses are both mounted in series on a common colinear axis with said optical detector means.

9. A receiver telescope means as in claim 4 where said telescope means further comprises a convex lens and a concave lens, said convex lens and said concave lens both mounted in series within said receiver telescope means on a common colinear axis with said optical detector means.

10. A reflective means as in claim 3, where said reflective means is a mirror.

11. A reflective means as in claim 4, where said reflective means is a mirror.

12. A signal threshold processor means as in claim 1 wherein said coarse track signal processing means utilizes a monostable multivibrator operable to provide a fixed threshold pulse of sufficient length to be read by said signal threshold processor means.

13. A signal threshold processor means as in claim 2, wherein said coarse track signal processing means further comprises:
    a threshold voltage comparator for each of said coarse track detector elements, said voltage comparator operable to compare a threshold voltage of predetermined amount to said electrical signal generated by said coarse track detector array elements, and said voltage comparator further operable to generate an output signal of logic one when said electrical signal from said coarse track detector array element is greater than said threshold voltage;
    a clock operable to be initiated when said pulsed laser illuminator fires said beam of optical energy;
    a range counter operable to be initiated by said pulses laser illuminator further operable to store a number proportional to the transitions which have occurred in said clock, wherein said transitions are proportional to the time between said pulsed laser illuminator pulse and the receipt of said electrical signal from said coarse track detector element;
    a latch system operable to be set to logic zero when said pulsed laser illuminator fires said optical energy and further operable to be set to a logic one when said threshold voltage is less than said electrical signal from said coarse track detector element and further operable to be reset by subsequent firings by said pulsed laser illuminator, and;
    a range gate operable to provide a readout of a binary word from said range counter, said binary word further operable to enter said signal threshold processor.

14. A signal threshold processor means as in claim 3 wherein said coarse track signal processing means utilizes a monostable multivibrator operable to provide a fixed threshold pulse of sufficient length to be read by said signal threshold processing means.

15. A signal threshold processor means as in claim 4, where said coarse track signal processing means further comprises:
    a threshold voltage comparator for each of said coarse track detector elements, said voltage comparator operable to compare a threshold voltage of predetermined amount to said electrical signal generated by said coarse track detector array elements, and said voltage comparator further operable to generate an output signal of logic one when said electrical signal from said coarse track detector array element is greater than said threshold voltage;
    a clock operable to be initiated when said pulsed laser illuminator fires said beam of optical energy;
    a range counter operable to be initiated by said pulses laser illuminator further operable to store a number proportional to the transitions which have occurred in said clock, wherein said transitions are proportional to the time between said pulsed laser illumination pulse and the receipt of said electrical signal from said coarse track detector element;
    a latch system operable to be set to logic zero when said pulsed laser illuminator fires said optical energy and further operable to be set to a logic one when said threshold voltage is less than said electrical signal from said coarse track detector element and further operable to be reset by subsequent firings by said pulsed laser illuminator, and;
    a range gate operable to provide a readout of a binary word from said range counter, said binary word further operable to enter said signal threshold processor.

16. A signal threshold processor means as in claim 1, 2, 3, or 4 wherein said fine track signal processing means further comprises:
    a resistor for each electrical signal received from each of said four fine track quadrants said resistor operable to convert said electrical signals to an analog voltage;
    an operational amplifier operable to receive said analog voltages from said resistors and further operable to amplify said analog voltages;
    a signal comparator means operable to compare said amplified analog voltages to a predetermined threshold voltage and further operable to produce an analog output signal if said threshold voltage is less than said amplified voltages;
    a range counter operable to receive said analog output signal from said signal comparator means;
    a sample and hold circuit means operable to receive said analog output signal from said signal comparator means and further operable to sample said analog voltage output signal and hold said output voltage until said sample and hold circuits are reset;
    analog to digital converters, said converters being interconnected to said sample and hold circuits and are operable to convert said analog electrical output voltage to a digital voltage; and at least four range gates, said gates operable to output said digital outputs from said analog to digital converters as four digital words.

17. A wide field of view optical detector as in claims 1, 2, 3 or 4 wherein said central fine track detector array portion further comprises four quadrants of equal surface area with an angle of 90° at the vertex of each of said quadrants.

18. A wide field of view optical detector as in claims 1, 2, 3 or 4 where said coarse track detector array portion further comprises two concentric ring structures abutting said fine track quadrants where each of said concentric ring structures comprises eight coarse track detector elements.

* * * * *